United States Patent
Nagata et al.

(10) Patent No.: US 6,680,950 B1
(45) Date of Patent: Jan. 20, 2004

(54) COLLISION AVOIDANCE TECHNIQUE FOR A MULTIPLE ACCESS RADIO COMMUNICATION SYSTEM

(75) Inventors: Masahiro Nagata, Tokyo (JP); Tetsunori Tada, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/471,607

(22) Filed: Dec. 23, 1999

(30) Foreign Application Priority Data

Dec. 24, 1998 (JP) .......................................... 10-365958

(51) Int. Cl.[7] ........................ H04L 12/413; H04L 12/43; H04J 3/02; H04Q 7/20
(52) U.S. Cl. ........................ 370/461; 370/447; 370/448; 370/445; 370/462; 455/453; 455/500; 455/510; 455/515
(58) Field of Search ................................. 370/338, 445, 370/447, 448, 461, 462, 348, 347; 455/450, 452, 453–455, 500, 510, 515

(56) References Cited

U.S. PATENT DOCUMENTS

| | | | | |
|---|---|---|---|---|
| 4,409,592 A | * | 10/1983 | Hunt | 340/825.5 |
| 5,440,555 A | * | 8/1995 | Momona | 370/79 |
| 5,764,629 A | * | 6/1998 | Bower et al. | 370/296 |
| 6,006,271 A | * | 12/1999 | Grabiec et al. | 709/235 |
| 6,038,223 A | * | 3/2000 | Hansson et al. | 370/329 |
| 6,078,566 A | * | 6/2000 | Kikinis | 370/286 |

* cited by examiner

*Primary Examiner*—William Trost
*Assistant Examiner*—Meless Zewdu
(74) *Attorney, Agent, or Firm*—Whitham, Curtis & Christofferson P.C.

(57) ABSTRACT

A radio base station, when detecting a collision of reception signals, transmits an access-restricted transmission allow signal IDLE2 to a irrelevant-to-collision radio terminal PS3 for access restriction. A plurality of relevant-to-collision radio terminals PS1 and PS2, when receiving the access-restricted transmission allow signal, set transmission delay times TR1 and TR2 determined by random numbers, respectively, and when receiving the access-restricted transmission allow signal after the lapse of their respective delay times, start the same transmission operation as when receiving a normal transmission allow signal. A separate radio terminal PS3, when receiving the access-restricted transmission allow signal before intended new signal transmission, suspends the new signal transmission until receiving the normal transmission allow signal.

5 Claims, 8 Drawing Sheets

UP-GOING SIGNAL  S_UP

| DESTINATION ADDRESS | CONTINUATION FLAG | SOURCE ADDRESS | UP-GOING TRANSMISSION DATA |
|---|---|---|---|

UP-GOING NAK SIGNAL  S_NAK

| ALL 0 | CONTINUATION FLAG | SOURCE ADDRESS | UP-GOING TRANSMISSION DATA |
|---|---|---|---|

DOWN-GOING SIGNAL  S_DOWN

| POLING ADDRESS | SIGNAL KIND | DESTINATION ADDRESS | CONTINUATION FLAG | DOWN-GOING TRANSMISSION DATA |
|---|---|---|---|---|

BUSY
IDLE
IDLE2

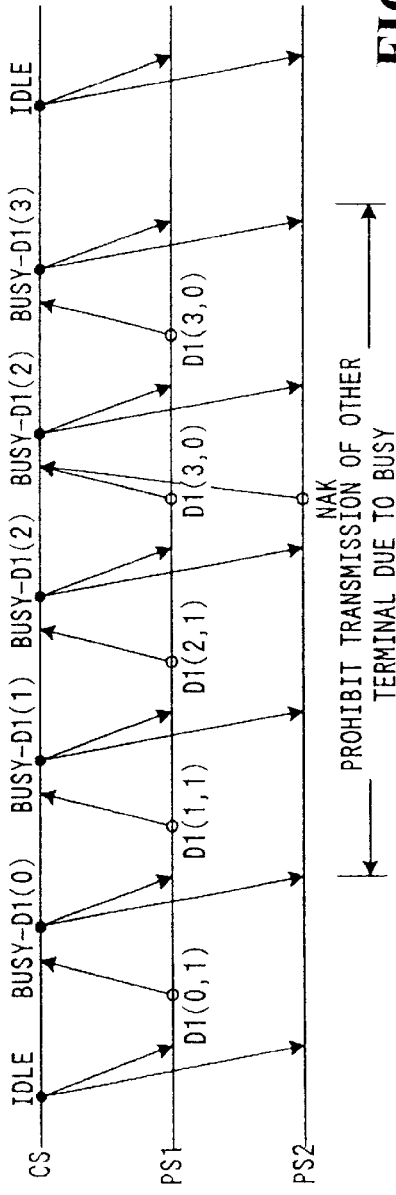
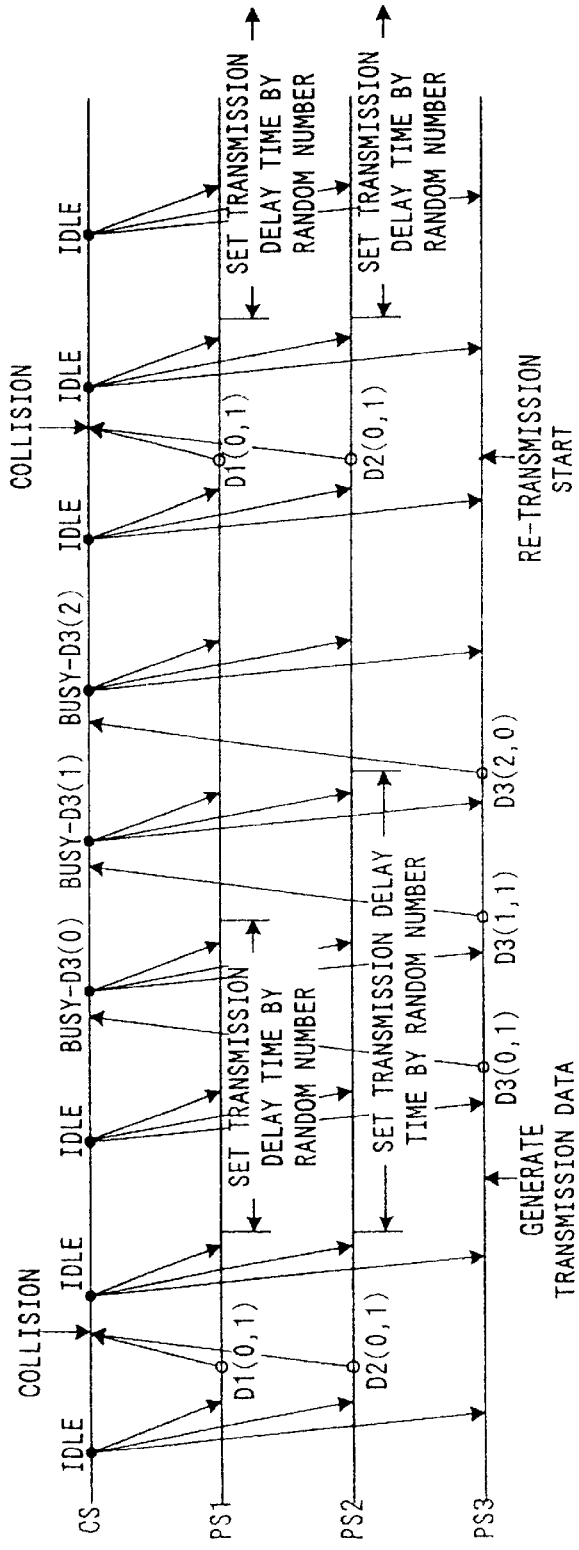

COLLISION AVOIDANCE TECHNIQUE FOR A MULTIPLE ACCESS RADIO COMMUNICATION SYSTEM

BACKGROUND OF THE INVENTION

The present invention relates to radio communication systems and, more particularly, to a multiple access method adopted for a radio communication system having a plurality of radio terminals.

For efficient utilization of limited communication medium, it is an indispensable technique to permit common use of a single transmission channel or a particular frequency band commonly by a plurality of terminals. In this technique, however, a problem of collision due to simultaneous accessing by a plurality of terminals is inevitable. In the Ethernet field, a multiple access system based on CSMA/CD (Carrier Sense Multiple Access with Collision Detection) is usually adopted.

However, it is difficult to adopt the carrier sense system directly for a radio packet communication system based on TDMA/TDD (Time Division Multiple Access with Time Division Duplex). This is so because it is difficult for radio terminals in the TDMA/TDD system to monitor up-going carriers although down-going packets can be monitored. Another problem encountered is that it is difficult for the base station to discriminate whether a reception error generated therein to be due to a collision or to an interference.

For alleviating the above problems, ICMA-PE (Idle-signal Casting Multiple Access with Partial Echo) has been proposed (Umeda and Onoue, "Radio Control Mobile Communication Random Access System with Partial Echo", Shingaku Gihoh, RCS 91-30). A system which adopts the ICMA-PE system for realizing point-to-multipoint packet communication, permits reducing the possibility of collision in a case where a plurality of terminals continuously transmit signal packets. Such a system is thus useful at low traffic levels.

Another multiple access system has also been proposed, which can ensure high throughput even at high traffic levels by adaptively and switchingly using two different access systems, i.e., one which is subject to collision such as the ICMA-PE system and the other one which is free from collision, such as a poling system (Japanese Patent No. 2746183).

A collision control method in the ICMA-PE system will now be briefly described with reference to the sequence diagrams of FIGS. 8(A) and 8(B).

Referring to FIG. 8(A), a radio base station CS informs terminals P connected thereto on radio of whether transmission is allowed or not by sending out a transmission allow signal (hereinafter referred to as IDLE signal) or a transmission non-allow signal (hereinafter referred to BUSY signal). The BUSY signal contains immediately previously received signal transmitted from a radio terminal and a poling address permitting discrimination thereof. The radio terminal which transmitted the signal thus can check whether or not the signal was received.

In the example shown in FIG. 8(A), a radio terminal PSI confirming an IDLE signal from the base station CS, transmits a first (head) signal packet D1(0, 1) as a division of transmission signal at the next transmission timing. In D1(0, 1), D1 indicates that the signal belongs to the radio terminal PS1, and (0, 1) indicates that the signal is the 0-th signal packet before next signal which is present and will be transmitted exists. In the actual ICMA-PE system, however, no sequence number (representing the sequential order of signal packet) is provided. In the Figure, however, sequence numbers are shown to facilitate the understanding.

Receiving signal D1(0, 1), the radio base station CS transmits next down-going signal BUSY-D1 (0), that is, it transmits BUSY signal together with the signal transmitted from the radio terminal PS1. Receiving BUSY-D1(0), the radio terminal PS1 recognizes that its own signal transmitted at the immediately preceding transmission timing has been received, and transmits the next signal packet. When a radio terminal PS2 monitoring the down-going signals detects a CRC (Cyclic Redundancy Check) error or the like, it transmits an NAK signal at the next transmission timing. FIG. 8(A) illustrates minimum control in the case when the radio terminal PS2 fails to continuously receive BUSY-D1(2) from the radio base station CS.

The NAK signal transmitted from the radio terminal PS2 at the transmission timing subsequent to the failure of correct reception of BUSY-D1 (2), collides with signal D1(3, 0) transmitted from the radio terminal PS1. When the radio base station CS detects this collision, it re-transmits BUSY-D1(2), i.e., the immediately previously transmitted down-going signal. When the radio terminal PS1 confirms that the next signal received from the radio base station CS is BUSY-D1(2), it re-transmits signal D1(3, 0), i.e., the immediately previously transmitted signal packet. It will be seen that in the ICMA-PE system, during continuous BUSY signal transmission no other radio terminal is allowed to transmit new signal. Thus, the frequency of collisions due to the multiple access can be greatly reduced.

In the ICMA-PE system, however, it is impossible to avoid collision of first signal packets. This will now be described with reference to the sequence diagram of FIG. 8(B).

When the radio terminals PS1 and PS2 simultaneously receive an IDLE signal from the radio base station CS and transmit respective first packets of transmission signal, a collision takes place. The radio base station CS recognizes the occurrence of a collision or an interference due to an CRC error or like error. However, since the idle state prevails at this time, the base station CS also transmits an IDLE signal at the next down-going signal transmission timing. Receiving this IDLE signal, the radio terminals PS1 and PS2 detect that a collision has taken place irrespective of first signal packet transmission, and set delay times for delaying the first signal packet transmission by generating random numbers. In FIG. 8(B), it is assumed that the radio terminals PS1 and PS2 set delay times corresponding to two and three transmission intervals, respectively.

If no transmission signal is transmitted from any other radio terminal until the lapse of the two transmission intervals, the radio terminal PS1 starts transmission. Subsequently, when receiving an IDLE signal from the radio base station CS after the end of the transmission from the radio terminal PS2, this time the ratio terminal PS2 starts transmission. However, if a radio terminal PS3 starts transmission while the radio terminals PS1 and PS2 are waiting during the delay times thereof (indicated as "transmission start" in the Figure), the radio terminals PS1 and PS2 start re-transmission of signal packets when receiving an IDLE signal transmitted from the radio base station CS after the end of the signal packet transmission from the radio terminal PS3 (indicated as "signal re-transmission start" in the Figure).

However, since the radio terminal PS1 and PS2 start packet transmission simultaneously, a collision takes place once again, thus inevitably making it necessary for the terminals PS1 and PS2 to set further delay times. If the radio terminal S3 starts transmission once again during these delay times, transmission retention times elapse in the radio terminals PS1 and PS2. In the long run, it may result that the radio terminal PS1 and PS2 have to abandon the transmission.

As shown above, in the ICMA-PE system, with traffic increase it becomes difficult to avoid collision of first signal packets that are transmitted. The collision of first signal packets transmitted may particularly frequently occur when a high traffic level compared to the transmission bandwidth is brought about by the signal communication among a plurality of terminals. Although a terminal which transmitted collided signal can re-transmit the signal when receiving an IDLE signal from the radio base station after the lapse of a delay time that has been set by generating a random number in response to the collision occurrence, a terminal which is irrelevant to the collision may start transmission while the terminal relevant to the collision is waiting during the delay time thereof. In this case, the signal transmission from the terminal irrelevant to the collision is transmitting signal when the delay time is elapsed. Therefore, the terminal relevant to the collision has to wait until reception of an IDLE signal transmitted from the radio base station after the end of the transmission by the terminal irrelevant to the collision. The other terminal relevant to the collision is in like state, and thus the possibility of collision of the re-transmitted first signal packets is increased. It will be seen that although the communication performance of the system is fixed in itself, it is differently shared by the individual radio terminals. In addition, the communication performance of the overall system is degraded by frequent occurrence of collisions and resultant accumulation of delay times for delaying the transmission.

SUMMARY OF THE INVENTION

The present invention has an object of eliminating or alleviating the above two drawbacks, i.e., different sharing of the communication performance and degradation of the system communication performance, in high traffic level states.

According to an aspect of the present invention, there is provided a multiple access method in a radio communication system, which adopts a system for random access control by collision detection and permits multiple accessing of a first radio station by a plurality of second radio stations, wherein: the first radio station, when detecting a collision of reception signals, transmits an access-restricted transmission allow signal to the irrelevant-to-collision second radio stations for setting access restriction therein until reception of a normal transmission allow signal.

In the multiple access method, an irrelevant-to-collision second radio station, when receiving the access-restricted transmission allow signal before intended new signal transmission, suspends the execution of the new signal transmission until receiving a normal transmission allow signal from the first radio station.

In the multiple access method, a plurality of relevant-to-collision second radio stations, when receiving the access-restricted transmission allow signal after the lapse of a transmission delay time set at the time of collision occurrence, start the same transmission operation as when receiving a normal transmission allow signal.

According to another aspect of the present invention, there is provided a multiple access method in a radio communication system comprising a radio base station for detecting a collision of reception signals and a plurality of radio terminals, wherein: the radio base station, when detecting a collision of reception signals, transmits an access-restricted transmission allow signal to irrelevant-to-collision radio terminals for setting access restriction; each of a plurality of irrelevant-to-collision radio terminals, when receiving the access-restricted transmission allow signal at a reception timing subsequent to the timing of transmission signal transmission, sets a transmission delay time determined by a random number, and when receiving the access-restricted transmission allow signal after the lapse of the transmission delay time, starts the same transmission operation as when receiving normal transmission allow signal; and an irrelevant-to-collision radio terminal, when receiving the access-restricted transmission allow signal before starting new signal transmission, suspends the execution of the new signal transmission until receiving the normal transmission allow signal.

According to other aspect of the present invention, there is provided a multiple access method in a cordless telephone system comprising a provisional master terminal constituted by a slave terminal having a function of detecting a collision of reception signals and a plurality of slave terminals and capable of allowing inter-slave terminal communication, wherein: the provisional master terminal, when detecting a collision of reception signals, transmits an access-restricted transmission allow signal to irrelevant-to-collision slave terminals; each of a plurality of irrelevant-to-collision slave terminals, when receiving the access-restricted transmission allow signal at a reception timing subsequent to the timing of transmission signal transmission, sets a transmission delay time determined by a random number and, when receiving the access-restricted transmission allow signal after the lapse of the transmission delay time, starts the same transmission operation as when receiving a normal transmission allow signal; and an irrelevant-to-collision slave terminal, when receiving the access-restricted transmission allow signal before intended new signal transmission, suspends the new signal transmission until receiving the normal transmission allow signal.

Other objects and features will be clarified from the following description with reference to attached drawings.

BRIEF DESCRIPTION OF THE DRAWINGS

FIGS. 8(A) and 8(B) show sequence diagrams for explaining a prior art collision control method in the ICMA-PE system.

PREFERRED EMBODIMENTS OF THE INVENTION

Preferred embodiments of the present invention will now be described with reference to the drawings.

Figure 1A:
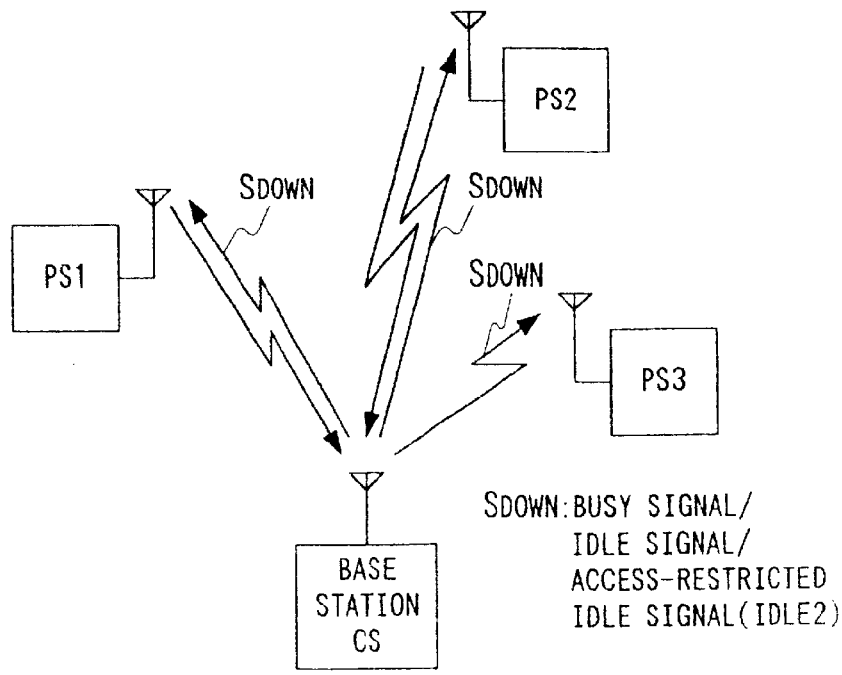
FIGS. 1(A) and 1(B) show a schematic view showing a mobile radio communication system for describing a first embodiment of the multiple access method according to the present invention and formats of an example of up-going and down-going signals.
Figure 1B:
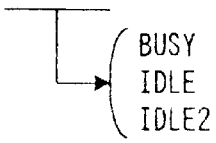

FIG. 1(A) is a schematic view showing a mobile radio communication system for describing a first embodiment of the multiple access method according to the present invention. FIG. 1(B) is a view showing formats of an example of up-going and down-going signals for realizing the embodiment. The suffix "up-going" represents the up-going direction from radio terminal to radio base station, and the suffix "down-going" represents the down-going direction from radio base station to radio terminal.

Referring to FIG. 1 (A), it is assumed that radio terminals PS1 to PS3 are found in a radio zone covered by a base station CS. It is also assumed that the radio station CS has a TDMA/TDD radio connection function and a multiple access control function based on the ICMA-PE system.

As will be described later, the base station CS can transmit not only BUSY and IDLE signals but also access-restricted IDLE2 signal as down-going signals $S_{DOWN}$. The IDLE signal represents a state that signal transmission is possible. The BUSY signal represents a state that signal transmission from the sole terminal presently transmitting signal is possible. The IDLE2 signal represents a state that signal transmission from the sole terminals relevant to a collision is possible.

As it will be described later, each radio terminal PS has a function of refraining from new transmission when receiving IDLE2 signal and also a function of setting a delay time of access by generating a random number when receiving in IDLE2 signal after transmission of a first signal packet at the immediately preceding transmission timing, as well as the function of normal signal communication.

As shown in FIG. 1(B), up-going signal $S_{UP}$ is constituted by a destination address, a continuation flag, a source address and up-going transmission signal. The destination address is the address of the destination of the up-going transmission signal. In the up-going signal $S_{UP}$, all the bits of the destination address are not "0". The continuation flag represents the presence or absence of signal to be transmitted continuously subsequent to the present signal packet. Up-going NAK signal $S_{NAK}$ is a signal packet, in which all the bits of the up-going signal destination address are set to "0". This signal is used for requesting re-transmission to the radio base station CS in the event of failure of normal reception of down-going signal $S_{DOWN}$ in a continuous reception process.

The down-going signal $S_{DOWN}$ is constituted by a poling address, a signal kind, a destination address, a continuation flag and down-going transmission signal. The poling address is the same as the source address. The signal kind is either BUSY, IDLE or IDLE2.

Figure 2:
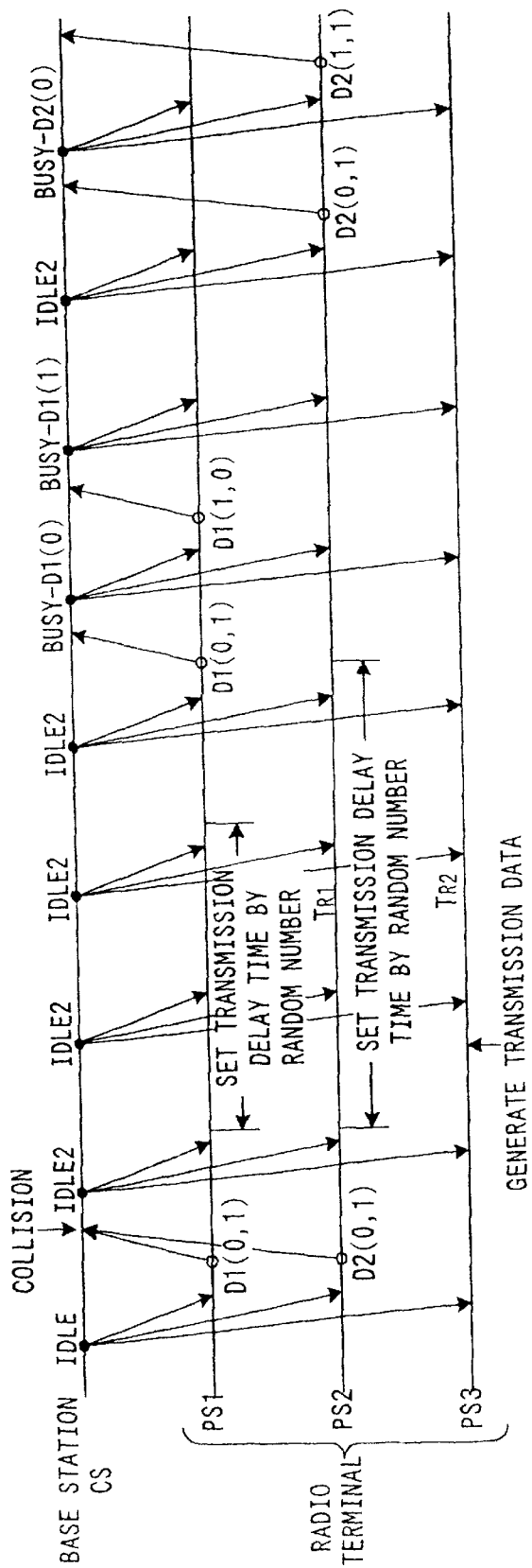
FIG. 2 shows a sequence diagram showing an example of communication in the first embodiment of the multiple access method according to the present invention.

FIG. 2 is a sequence diagram showing an example of communication in the first embodiment of the multiple access method according to the present invention.

Referring to the Figure, it is assumed that the radio terminals PS1 and PS2 receiving an IDLE signal transmit first signal packets at the next transmission timing and that these packets collide with each other. The radio station CS detects this collision, and transmits an access-restricted IDLE2 signal as the next down-going signal, thus informing the other radio terminal PS3 of the access-restricted idle state. The radio terminals PS1 and PS2 receiving the IDLE2 signal detect that a collision has taken place, and set respective delay times TR1 and TR2 by generating random numbers to wait for the lapse of these delay times. Generating signal to be transmitted during the delay times, the radio terminal PS3 refrains from transmitting the signal since the access-restricted idle state prevails. After the lapse of two transmission intervals, the radio terminal PS1 starts transmission. After the end of this transmission, the radio base station CS transmits an access-restricted IDLE2 signal, thus allowing the radio terminal PS2 to transmit signal.

In the prior art system as shown in FIG. 8(B), an IDLE signal is transmitted when a collision has taken place. Therefore, in the example described above the radio terminals PS1 and PS2 receiving an IDLE signal start transmission of transmission signal present therein, thus resulting in a collision. According to the present invention, preference is given to transmission from terminals which have transmitted collided signal. That is, in the above prior art example state, for instance, access-restricted IDLE2 signal is utilized to reduce cases when the signal communication performance is shared differently by the individual terminals. It is thus possible to greatly reduce the collision occurrence frequency which is increasing with increasing number of terminals and increasing communication traffic.

After the transmission from the terminals PS1 and PS2, relevant to the collision, has been ended, the base station CS transmits an IDLE signal afresh. Receiving this IDLE signal the terminal PS3 with communication signal therein starts transmission.

A second embodiment of the multiple access method will now be described. The second embodiment is based on a direct inter-slave terminal communication MODE in PHS (Personal Handy-phone System), and adopts the ICMA-PE system as the basic access control system for organizing a network based on point-to-multipoint communication. In this embodiment, a radio terminal having a function corresponding to the radio base station CS is referred to as provisional master terminal, which periodically transmits a sync signal to realize the point-to-multipoint communication with slave terminals connected to it.

Figure 3:
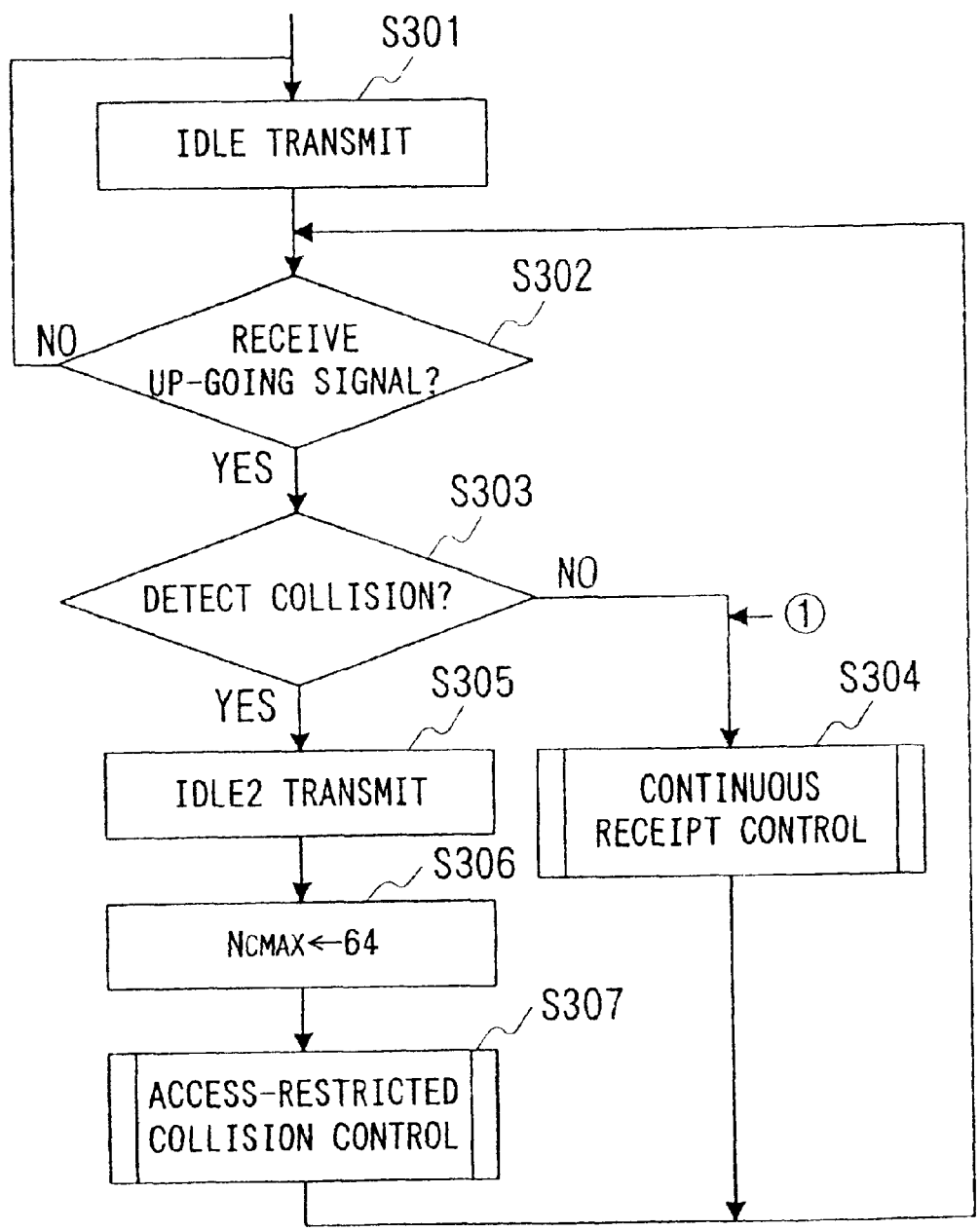
FIG. 3 shows a flow chart showing the operation of the provisional master terminal (or radio base station) in the second embodiment of the present invention.

FIG. 3 is a flow chart showing the operation of the provisional master terminal (or radio base station) in the second embodiment of the present invention. In the IDLE state, the provisional master terminal transmits an IDLE signal (step S301), and waits for receiving an up-going signal (NO in step S302). When detecting an up-going signal, the provisional master terminal checks for any collision (step S303). When detecting no collision (NO in step S303), the provisional master terminal executes continual reception control (step S304) to be described later. When detecting a collision (YES in step S303), the provisional master terminal transmits an IDLE2 signal (i.e., access-restricted idle signal) (step S305), then sets "64" in a maximum continuous collision control times number counter NCMAX (step S306), and executes access-restricted collision control (step S307) to be described later.

Figure 4:
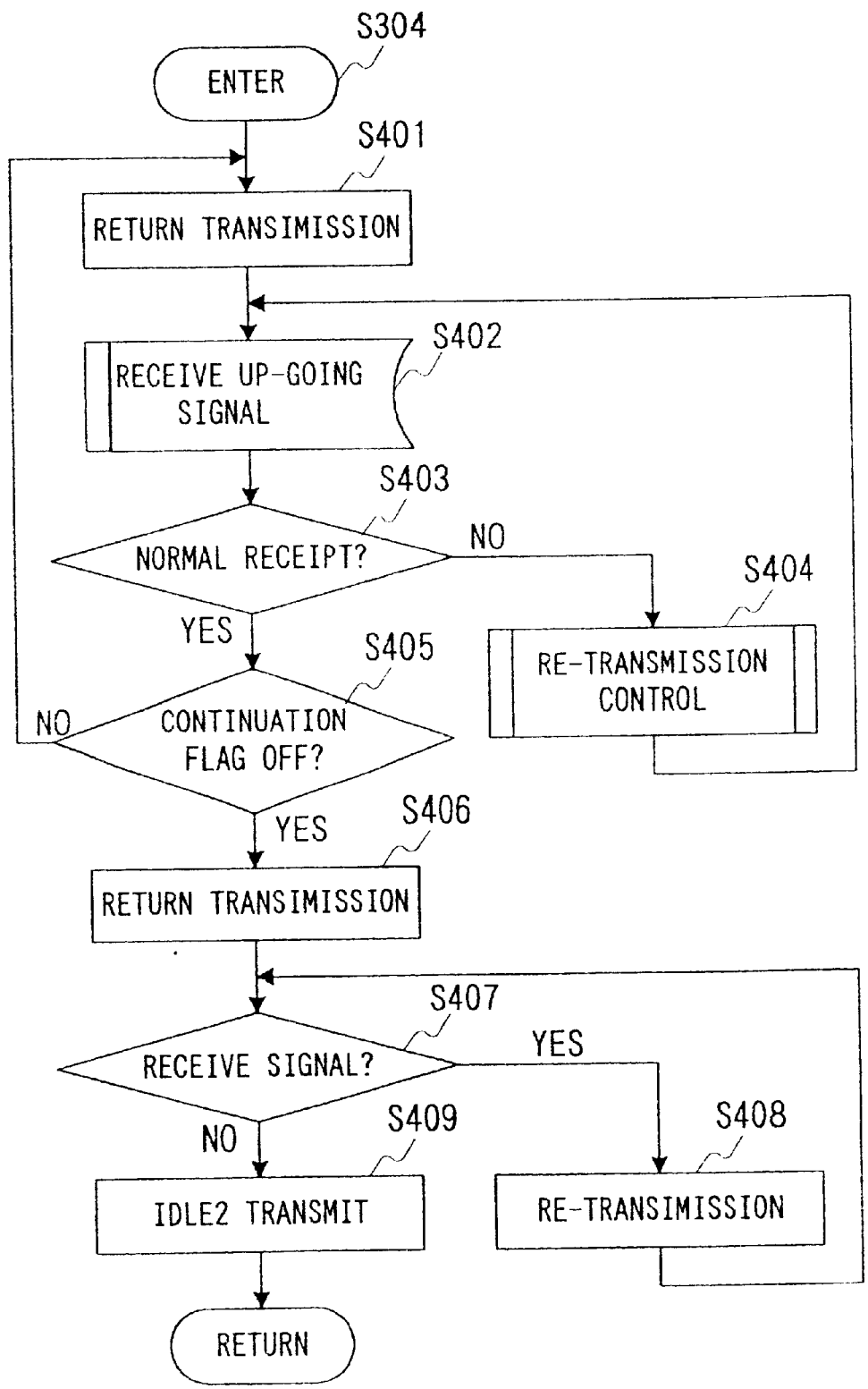
FIG. 4 shows a flow chart showing the step S304 of continual reception control in FIG. 3.

FIG. 4 is a flow chart showing the step S304 of continual reception control in FIG. 3. Without occurrence of any up-going signal collision (NO in step S303 in FIG. 3), the provisional master terminal executes a continual reception control process.

First, the provisional master terminal executes return transmission of received up-going signal in a down-going BUSY signal format (step S401), and executes signal processing of the received up-going signal (step S402). When detecting that the up-going signal has been normally received (YES in step S403), the provisional master terminal checks the continuation flag in this signal (step S405). If the continuation flag is "on" (NO in step 405), the routine goes back to the step S401 of return transmission. When failing to normally receive the up-going signal or receives a NAK signal (NO in step S403), the provisional master terminal executes re-transmission control (step S404). The routine then goes back to the step S402 of up-going signal processing.

When detecting the continuation flag of the received up-going signal to be "off" (YES in step S405), the provisional master terminal executes return transmission of the signal with the continuation flag "off" down-going signal (step S406), and then monitors up-going signal (step S407). When an up-going signal is received at the immediately succeeding timing (YES in step S407), it is a NAK signal from a radio terminal or an interference corresponding to NAK. Thus, the provisional master terminal executes re-transmission (step S408), and monitors the next up-going signal once again (step S407).

When receiving no up-going signal (NO in step S407), the provisional master terminal transmits IDLE2 signal (step S409). The routine then returns to step S302 in FIG. 3. The IDLE2 signal is transmitted in the last in order to provide preference to the signal transmission from the terminal, which could not transmit signal because of the longer delay time set by random number generation right after the collision occurrence. Thus, when receiving the IDLE2 signal, the irrelevant-to-collision terminals are not allowed to transmit, and shall be allowed to start signal transmission when and only when receiving the next IDLE signal.

Figure 5:
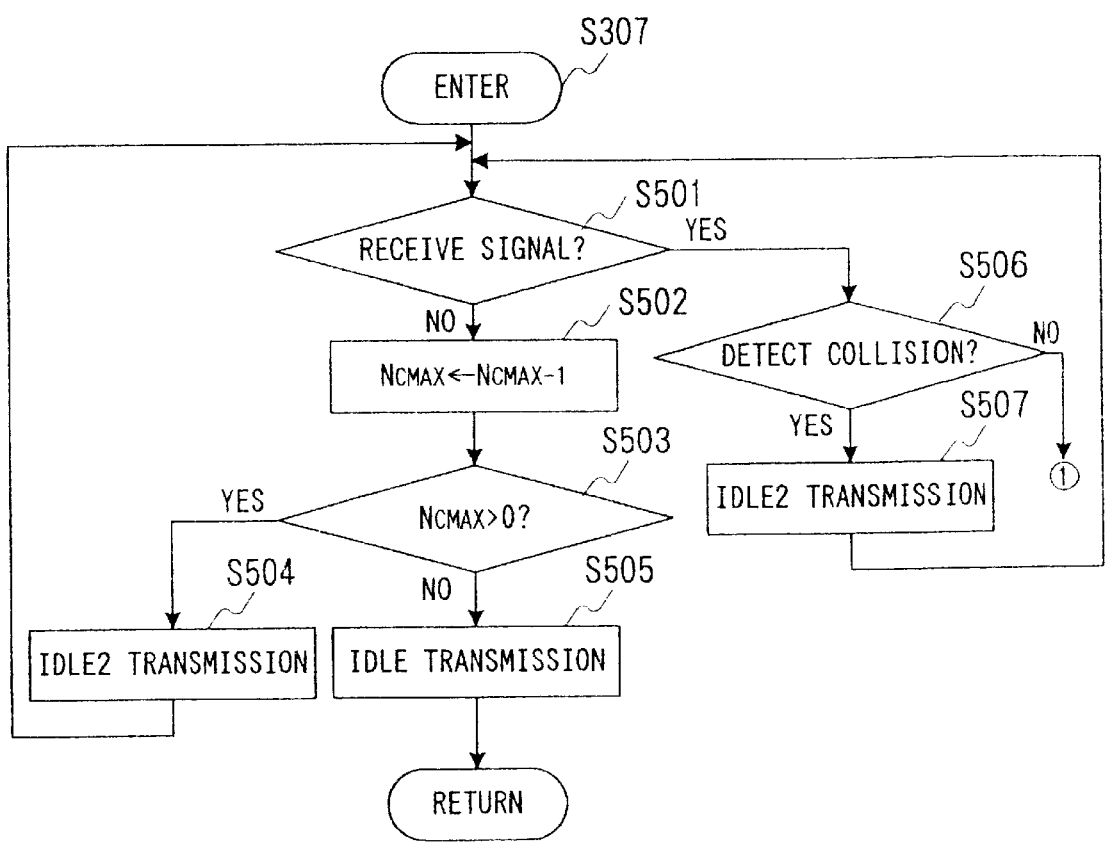
FIG. 5 shows a flow chart showing the step S307 of access-restricted collision control in FIG. 3.

FIG. 5 is a flow chart showing the step S307 of access-restricted collision control in FIG. 3. The provisional master terminal executes the access-restricted collision control (step S307 in FIG. 3) subsequent to the IDLE2 signal transmission (step S305) and the setting of the maximum continuous collision control times number counter $N_{CMAX}$ (step S306) after the up-going signal collision occurrence (YES in step S307).

In this routine, after the IDLE2 signal transmission the provisional master terminal monitors up-going signal reception (step S501). When receiving no signal (NO in step S501), the provisional master terminal decrements the value of the maximum continuous collision control times number counter NCMAX (step S502). Unless the value of the maximum continuous collision control times number counter NCMAX is "0" (YES in step S503), the provisional master terminal re-transmits IDLE2 signal (step S504). The routine then goes back to the step S501. When the value of the maximum continuous collision control times number counter NCMAX is found to be "0" (NO in step S503), the provisional master terminal transmits IDLE signal (step S505), thus releasing the access restriction. The routine is then returned to the step S302 (normal idle state) in FIG. 3.

When receiving the signal at a signal reception timing (YES in step S501), the provisional master terminal checks whether a collision has occurred (step S506). When a collision has occurred (YES in step S508), the provisional master terminal transmits IDLE2 signal (step S507). The routine is then returned to the step S501. This occasion means the occurrence of a collision afresh due to the same delay times set after the first collision occurrence. When normally receiving up-going signal (NO instep S506), the provisional master terminal releases the access-restricted collision control state, and executes the step S304 of continual reception control in FIG. 3.

Figure 6:
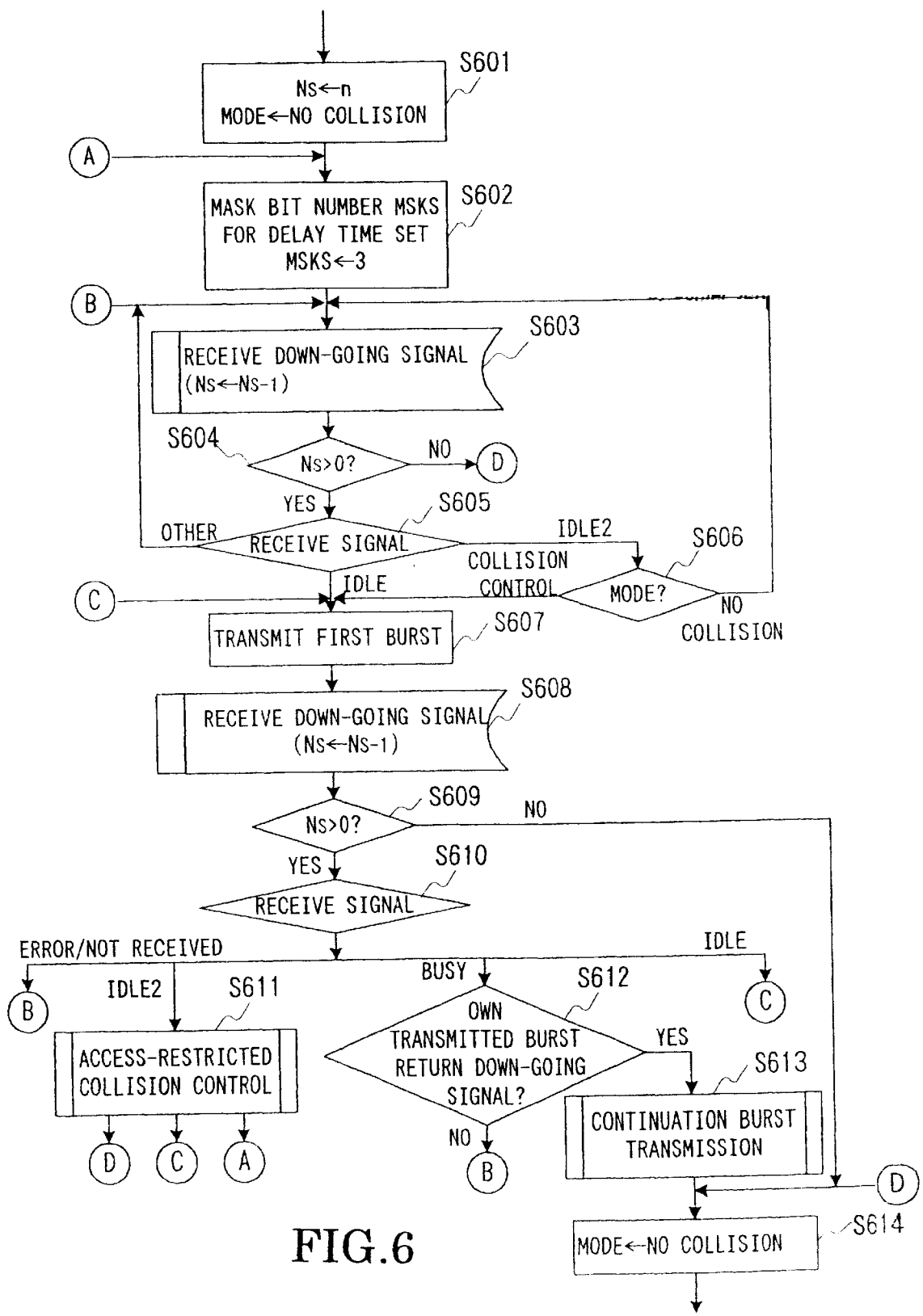
FIG. 6 shows a flow chart showing a control process executed in a slave terminal (i.e., radio terminal) in this embodiment.

FIG. 6 is a flow chart showing a control process executed in a slave terminal (i.e., radio terminal) in this embodiment. First, the slave terminal sets transmission signal holding timer (number of cycles) Ns to predetermined number n, thus setting a waiting time before the start of transmitting generated transmission signal, and also sets the MODE to "no collision" (step S601). Then the slave terminal sets mask bit number MSKS for delay time setting to "3" (step S602). As will be described later, when MSKS=3, three bits of a random number is set, and the delay time is set to one of "1" to "8".

Then, at a reception timing the slave terminal executes a down-going signal reception process, and also it decrements the transmission signal holding timer (number of cycles) Ns (step S603). Then, the slave terminal checks whether Ns>0 (step S604). Unless Ns>0, i.e., when Ns=0, the slave terminal discards the generated transmission signal, and then executes a step S614. When Ns>0 (YES in step S604), the slave terminal checks the kind of received signal (step S605).

When the slave terminal receives neither IDLE signal nor IDLE2 signal, that is, when it receives a BUSY signal or an error or no signal (OTHER in step S605), the routine goes back to the step S603. When receiving IDLE2 signal (IDLE2 in step S608), the slave terminal checks whether the MODE is "no collision" or "collision control" (step S606). When the MODE is "no collision", the routine goes back to the step S603. When the MODE is "collision control", the slave terminal detects that its next state prevails. That is, the slave terminal detects that, after the setting of a transmission delay time in response to the occurrence of a collision, the other radio terminal has started transmission and completed a series of signal transmission before the lapse of the delay time set by it, so that it is now allowed to transmit signal. The slave terminal now allowed to transmit signal divides its transmission signal, and executes burst transmission of the first packet of the signal (step S607). When receiving IDLE signal (IDLE in step S605), the slave terminal is allowed to transmit signal, and it thus executes the step S607 of first packet burst transmission.

At the reception timing subsequent to the first packet burst transmission, the slave terminal executes a reception process, and also decrements the transmission signal holding timer (number of cycles) Ns (step S608). Then, the slave terminal checks whether Ns>0 (step S609). Unless Ns>0, that is, when Ns=0 (NO in step S604), the slave terminal discards generated transmission signal, and then executes the step S614. When Ns>0 (YES in step S609), the slave terminal checks the kind of received signal (step S610).

When the slave terminal receives an error or no signal has been received, the routine goes back to the step S603 of the down-going signal reception process. When IDLE signal has been received, it means that the own transmission signal has not arrived at the radio base station. In this case, the routine goes back to the step S607 of first packet burst transmission. When IDLE2 signal has been received, it means that a collision has occurred. In this case, the routine goes to step S611 of access-restricted collision control as will be described later.

When receiving BUSY signal, the slave terminal checks whether its own transmitted first packet burst has been returned in the down-going signal (step S612). When its own transmitted first packet burst has been returned in the received down-going BUSY signal (YES in step S612), the slave terminal executes continual burst transmission process (step S613), and then sets the MODE to "no collision" (step S614), thus bringing an end to the signal transmission process. When an up-going burst transmitted from a radio terminal other than itself has been in the received return transmitted BUSY signal (NO in step S612), the routine goes back to the step S603 of the down-going signal reception process.

Figure 7:
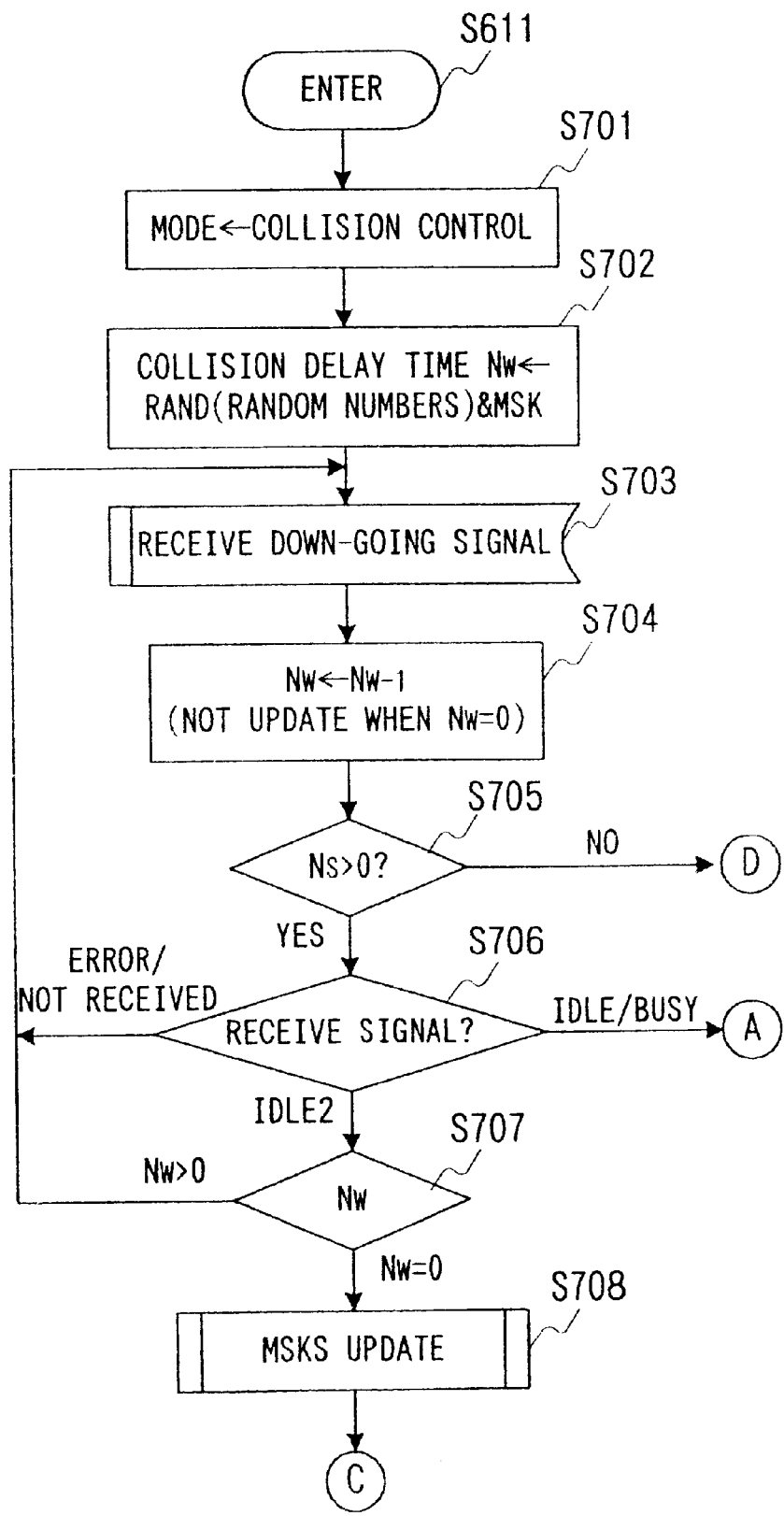
FIG. 7 shows a flow chart showing the access-restricted collision control process shown in FIG. 6.

FIG. 7 is a flow chart showing the access-restricted collision control process shown in FIG. 6. First, the slave terminal sets the MODE to "collision control" (step S701), and then sets the delay time Nw concerning the collision (step S702). The delay time Nw concerning the collision is determined by generating a random number RAND and ANDing this RAND and mask bit number MSKS (here MSKS=3) for the delay time setting.

At the subsequent reception timing the slave terminal executes a reception process, and also decrements the transmission signal holding timer Ns (step S703). Then unless Nw=0 the slave terminal decrements the delay time Nw concerning the collision, but otherwise it does not update Nw (step S704). Then, the slave terminal checks whether Ns>0 (step S705). Unless Ns>0, that is, when NS=0 (NO in step S705), the slave terminal discards generated transmission signal, and then executes the step S614 in FIG. 6. When Ns>0 (YES in S705), the slave terminal checks the kind of received signal (step S706).

When an error or no signal is found to be received, the routine goes back to the step S703. When IDLE signal or BUSY signal is found to be received, the routine goes back to the step S602 of MSKS initialization shown in FIG. 6 without updating the MODE. When the IDLE signal is found to be received at this timing, the maximum number NCMAX of the collision control state of the provisional master terminal (i.e., radio base station) has been elapsed (see step S505 in FIG. 5). Thus, during Ns 0 the save terminal (radio terminal) continuously resumes the process of transmitting the same transmission signal. When receiving the BUSY signal, the slave terminal detects that continual transmission has been started by a different relevant-to-collision radio terminal concerning the collision after the lapse of the delay time set by the other radio terminal. Thus, the present slave terminal starts transmission of its own signal after completion of a series of signal transmission.

When finding in the step S706 that it has received the IDLE2 signal has been received, the slave terminal checks the delay time Nw (step S707). In this case, when Nw>0 (the delay time having not yet been elapsed), the routine goes back to the step S703. When Nw=0, the slave terminal is allowed to transmit signal. Thus, the slave terminal updates (i.e., increments) MSKS (step S708), and then executes the step S607 shown in FIG. 6. The MSKS updating is done in order to extend the delay time set after a collision occurs afresh as a result of the first packet burst transmission in the step S607.

As has been described in the foregoing, in the multiple access method according to the present invention the access-restricted idle signal has an effect of prohibiting signal transmission by a irrelevant-to-collision radio terminal during delay times set after the occurrence of a collision. The access-restricted idle signal thus transmitted permits maintaining the sequence of signal transmission from a plurality of terminals and preventing radio terminals, which is subject to signal transmission prohibition for long time in a high traffic level circumstance. In other words, it is possible to organize a radio packet transmission system, which can provide uniform communication rate to a plurality of radio terminals and permits uniform sharing of the signal communication performance by the terminals.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A multiple access method in a radio communication system, which includes a system for random access control in response to collision detection and permits multiple accessing of a first radio station by a plurality of second radio stations, said method comprising steps of:
   detecting a collision of signals received at said first radio station;
   transmitting an access restricted transmission allow signal from said first radio station to second radio stations which are irrelevant to said collision of signals detected in said detecting step;
   setting, responsive to said access restricted transmission allow signal, access restriction in said second radio stations which are irrelevant to said collision detected in said detecting step; and
   resetting access restriction in said second radio stations which are irrelevant to said collision detected in said detecting step responsive to reception of a normal transmission allow signal at a said second radio station.

2. The multiple access method according to claim 1, wherein an irrelevant-to-collision second radio station, receiving the access-restricted transmission allow signal before intended new signal transmission, suspends the execution of the new signal transmission until receiving a normal transmission allow signal from the first radio station.

3. The multiple access method according to claim 2, a plurality of relevant-to-collision second radio stations, when receiving the access-restricted transmission allow signal after the lapse of a transmission delay time set at the time of collision occurrence, start a normal transmission operation corresponding to a transmission operation as when receiving a normal transmission allow signal.

4. A multiple access method in a radio communication system comprising a radio base station for detecting a collision of reception signal and a plurality of radio terminals, said method comprising the steps of:
   detecting a collision of signals received at said radio base station;
   transmitting an access restricted transmission allow signal from said radio base station to irrelevant-to-collision radio terminals;
   setting, responsive to said access restricted transmission allow signal, a transmission delay time determined by a random number;
   restarting a normal transmission operation, after the laps of the transmission delay time, that is responsive to receiving the access restricted transmission allow signal; and
   suspension the execution of the new signal transmission by said irrelevant to collision radio terminal until receiving the normal transmission allow signal, when receiving the access restricted transmission allow signal before starting new signal transmission.

5. A multiple access method in a cordless telephone system comprising a provisional master terminal constituted by a slave terminal having a function of detecting a collision of reception signals and a plurality of slave terminals and capable of allowing iter-slave terminal communication, said method comprising steps of:

detecting a collision of signals received at said provisional master terminal;

transmitting an access restricted transmission allow signal from said provisional master terminal to irrelevant to collision slave terminals;

setting, responsive to said access restricted transmission allow signal, a transmission delay time determined by a random number access restricted transmission in said slave terminals which are irrelevant to said collision detected in said detecting step, and suspending a new signal transmission until receiving the normal transmission access restriction allow signal in said slave terminals which are irrelevant to said collision detected in said detecting step.

* * * * *